United States Patent [19]

Goleby

[11] Patent Number: 5,403,986
[45] Date of Patent: Apr. 4, 1995

[54] STRUCTURAL MEMBER AND METHOD OF MAKING BY COLD ROLLING FOLLOWED BY INDUCTION OR RESISTANCE WELDING

[75] Inventor: Leslie D. Goleby, Queensland, Australia

[73] Assignee: Tube Technology Pty. Ltd., Queensland, Australia

[21] Appl. No.: 64,042

[22] PCT Filed: Sep. 25, 1991

[86] PCT No.: PCT/AU91/00442
§ 371 Date: May 20, 1993
§ 102(e) Date: May 20, 1993

[87] PCT Pub. No.: WO92/05895
PCT Pub. Date: Apr. 16, 1992

[30] Foreign Application Priority Data

Sep. 28, 1990 [AU] Australia .................. PK2531

[51] Int. Cl.$^6$ .................. B23K 11/00; B23K 13/01; E04C 3/32
[52] U.S. Cl. .................. 219/61.2; 52/729; 219/617
[58] Field of Search .................. 219/61.2, 61.3, 60 R, 219/60.2, 617; 29/897.31, 897.312, 897.3, 897.33, 897.34, 897.35; 228/146, 147, 173.4, 173.6, 173.7; 512/364, 720, 729, 731.1, 731.7, 731.8

[56] References Cited

U.S. PATENT DOCUMENTS

| D. 27,394 | 7/1897 | Horton . |
| D. 28,864 | 6/1898 | Baker . |
| D. 32,294 | 2/1900 | Bissell . |
| 195,207 | 2/1877 | De Buigne . |
| 426,558 | 0/1890 | Dithridge . |
| 991,603 | 5/1911 | Brooks . |
| 1,377,251 | 5/1921 | Hunker . |
| 1,454,659 | 5/1923 | Thurston . |
| 1,623,939 | 4/1927 | Kraft . |
| 2,127,618 | 8/1938 | Riemenschneider . |
| 3,140,764 | 7/1964 | Cheskin . |

(List continued on next page.)

FOREIGN PATENT DOCUMENTS

121608 7/1946 Australia .

(List continued on next page.)

OTHER PUBLICATIONS

Derwent Abstract Accession No. B7412 E/07, SU-82-7-723, May 22, 1981.
Derwent Abstract Accession No. 87-161194/23, SE 8504-948-A, Apr. 22, 1987.
"How HF Forge Welding Works For You," Welded Beam Corp., No Publication Date.
Patents Abstracts of Japan, M8, p. 120, JP 55-22443 (A), "Production of Frame Material," National Jiyuutaki Kenzai K. K. (assignee) Feb. 18, 1980.
Russian Text Reference — "Prestressed Steel Structures," Ferentschik et al., 1979.
Derwent Abstract Accession No. A3410A/02, Class P52 (Mosc Aviatn Techn) Jun. 10, 1977.
Derwent Abstract Accession No. 91-071965/10, Class P52, SU, A, 1558,529 (UKR Metals Res Inst) Apr. 23, 1990.
Patents Abstracts of Japan, M78, p. 57, JP, A, 56-50724 (Nitsutetsu Kenzai K.K.) Aug. 5, 1981.
Patent Abstracts of Japan, M660, p. 14, JP, A, 62-176611 (Nisshin Steel Co Ltd.) Mar. 8, 1987.

*Primary Examiner*—Geoffrey S. Evans
*Attorney, Agent, or Firm*—Nixon & Vanderhye

[57] ABSTRACT

A multiple component structural member is made by cold roll forming two continuous strips of metal on opposite sides of a third continuous strip of metal. The cold rolling process creates two hollow flange elements with a continuous aperture in which the edges of the third continuous strip of metal is partly extended, followed by resistance or induction welding to create the multiple component structural member.

18 Claims, 11 Drawing Sheets

U.S. PATENT DOCUMENTS

| | | |
|---|---|---|
| 3,199,174 | 8/1965 | Nilsson et al. . |
| 3,241,285 | 3/1966 | Baroni . |
| 3,256,670 | 6/1966 | Tersigni . |
| 3,342,007 | 9/1967 | Merson . |
| 3,362,056 | 1/1968 | Preller et al. .................... 228/173.6 |
| 3,427,427 | 2/1969 | Rudd . |
| 3,434,198 | 3/1969 | Bergantini . |
| 3,452,433 | 7/1969 | Scofield . |
| 3,517,474 | 0/1970 | Lanternier . |
| 3,698,224 | 10/1972 | Saytes ............................. 29/897.35 |
| 3,713,205 | 1/1973 | Wogerbauer . |
| 3,735,547 | 5/1973 | Moyer et al. . |
| 3,827,117 | 8/1974 | Oilman . |
| 3,860,781 | 1/1975 | Aschauer . |
| 4,002,000 | 1/1977 | Howard et al. . |
| 4,246,737 | 1/1981 | Eiloart et al. ........................ 52/729 |
| 4,402,206 | 9/1983 | Yanazawa et al. . |
| 4,433,565 | 2/1984 | Preller . |
| 4,460,118 | 1/1984 | Ataka et al. . |
| 4,468,946 | 2/1984 | Driear . |
| 4,586,646 | 5/1986 | Booher . |
| 4,750,663 | 6/1988 | Warczak . |
| 4,881,355 | 11/1989 | Bosi et al. . |

FOREIGN PATENT DOCUMENTS

| | | |
|---|---|---|
| 124770 | 7/1947 | Australia . |
| 59988/69 | of 1971 | Australia . |
| 61568 | 8/1973 | Australia . |
| 68793 | 3/1977 | Australia . |
| 482303 | 3/1977 | Australia . |
| 39587/78 | 3/1980 | Australia . |
| 81034 | 5/1981 | Australia . |
| 80609 | 6/1981 | Australia . |
| 81033 | 6/1981 | Australia . |
| 83893 | 11/1981 | Australia . |
| 82833 | 7/1982 | Australia . |
| 84401 | 8/1982 | Australia . |
| 733702 | of 1966 | Canada . |
| 107513 | 6/1967 | Denmark . |
| 0132894 | of 1985 | European Pat. Off. . |
| 267843 | 5/1988 | European Pat. Off. . |
| 2374977 | 7/1978 | France . |
| 2549933 | of 1985 | France . |
| 812600 | 7/1949 | Germany . |
| 1023120 | 1/1958 | Germany . |
| 1132701 | 7/1962 | Germany . |
| 3319745 | of 1984 | Germany . |
| 13122 | 1/1975 | Norway . |
| 444464 | 4/1986 | Sweden . |
| 8504948 | 4/1987 | Sweden . |
| 1651 | 7/1858 | United Kingdom ............. 29/897.35 |
| 1575742 | 9/1920 | United Kingdom . |
| 646646 | of 1950 | United Kingdom . |
| 2093886 | of 1982 | United Kingdom . |
| 2102465 | of 1983 | United Kingdom . |
| 2145145 | of 1985 | United Kingdom . |
| 245935 | 10/1967 | U.S.S.R. . |
| 827723 | 5/1981 | U.S.S.R. . |
| 872690 | 10/1981 | U.S.S.R. . |
| 968251 | 10/1982 | U.S.S.R. . |
| 1026997 | 7/1983 | U.S.S.R. . |
| 90-01091 | 2/1990 | WIPO . |

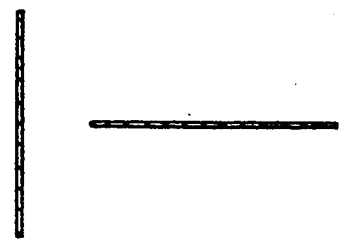
Stage 1
Stage 5
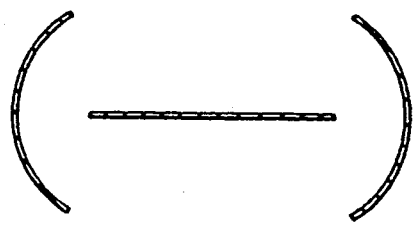
Stage 2
Stage 6
Stage 3
Stage 7
Stage 4
Stage 8
Fig.1.

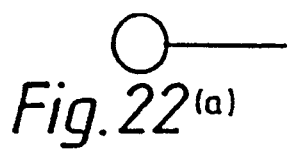
Fig.22(a)
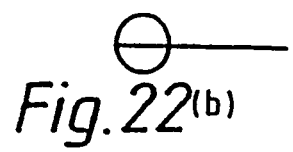
Fig.22(b)
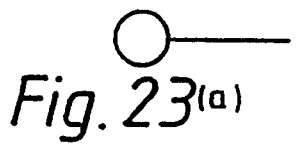
Fig.23(a)
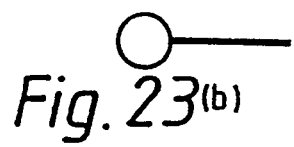
Fig.23(b)

Fig.25(a)
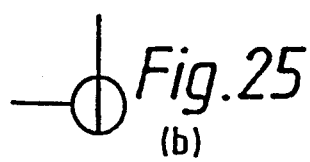
Fig.25(b)
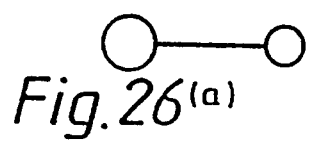
Fig.26(a)
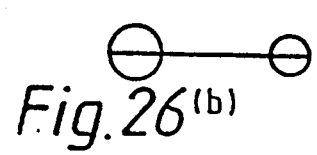
Fig.26(b)
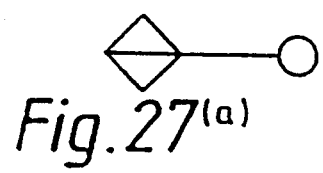
Fig.27(a)
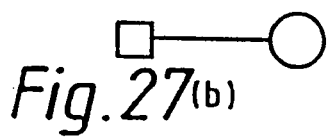
Fig.27(b)

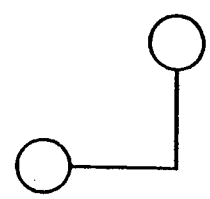
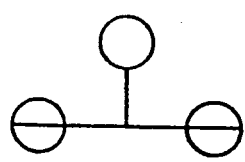
Fig.29.
Fig.30.

STRUCTURAL MEMBER AND METHOD OF MAKING BY COLD ROLLING FOLLOWED BY INDUCTION OR RESISTANCE WELDING

This invention relates to a structural member and a process for continuous formation of said structural members.

Processes for continuous formation of structural members are well known. U.S. Pat. No. 3,427,427, for example describes a process for forming finned metal tubes by welding a double strip of metal helically about or longitudinally of a tubular member and then forcing apart the adjacent strips to form parallel helical or longitudinal cooling fins. A tubular member having one or more transverse flanges may also be formed by welding a double strip of metal to a planar flange member.

Reference is also made in U.S. Pat. No. 3,827,117 to a process and apparatus for forming truss members which comprise simultaneously forming channel members from a pair of endless strips, forming strut members from an endless third strip, then guiding the channels in a predetermined relation to each other with a continuous folded strut member therebetween and thereafter welding the apices of the struts to the channel members.

It is known in the art to form solid structural members such as I-beams, H-beams, Z-beams and T-beams wherein coils of steel are slit to width, designated as either flanges or webs and continuously fed through a high frequency forge welding mill wherein electrical contacts induce high frequency current which in turn creates a hot plastic metal region on the edges of the web and in the middle of the flanges. High pressure rolls then forge the plastic regions of the steels together metallurgically to produce a true forged weld without the use of filler materials. Exemplary of this process is U.S. Pat. No 3,713,205 which relates to a process for producing structural members such as I- or T-beams having one or two solid flanges attached to a web.

Other methods of producing solid flange structural members are descried in U.S. Pat. No. 3,199,174 which attaches flange strips to longitudinal edges of a web by fillet welds. U.S. Pat. Nos. 3,760,781, 3,713,205 and 4,586,646 also describe similar methods of forming structural members.

Conventional solid structural members have certain disadvantages which are described fully in Patent Specification PCT/AU89/00313 to the present applicant. These briefly include:
 (i) high exposed surface area to mass and strength ratios which lead to increased costs for both corrosion protection and fire proofing; and
 (ii) web width to thickness ratios are generally limited to avoid reductions in section load bearing capacity due to local buckling considerations and the method of manufacture leads to production of substantial mill scale and rust.

The aforementioned PCT specification describes a structural member having a central web and a hollow flange extending along each edge thereof. This structural member is formed continuously from a single sheet of metal by a roll forming process. This structural member was found to be useful in many ways in that it simulated the strength characteristics of traditional hot rolled steel structural members such a I-beams, H-beams and RSJ's but without many of the disadvantages of such traditional structural members.

Hollow flanged structural members are described in Merson U.S. Pat. No. 3,342,007 and U.S. Pat. No. 1,377,251. The hollow side flanges are formed with a free edge positioned adjacent the web member but unsecured thereto. Other relevant prior art structural members are disclosed in Australian Design Registrations 81038, 81034, 82833 or 84401 which each disclosed a structural member formed from a multiplicity of separate components comprising a web and a pair of hollow flange sections all made from thin sheet material and wherein the edges of the web were received in the interior of each of the hollow end sections and abutted an internal surface of same. In each of these cases the process of formation was not described and thus the hollow flange sections could be press formed or roll formed for example. The web presumably would be attached to each hollow flange section by a spot welding process for example and thus does not suggest the economics of a continuous process nor does it suggest the strength characteristics inherent in structural members formed in accordance with the present invention.

Reference may also be made to U.S.S.R. Patent 827723 which describes a profiled structural element similar to that described in U.S. Pat. No. 3,342,007. This element is manufactured from a single sheet and has a web and hollow flange sections wherein adjacent faces of the web and flange sections may be welded by seam welding. Each flange section includes a free edge portion which extends into the confines thereof. It is not clear from this reference whether the seam welding process is continuous or discontinuous but it does appear that the seam weld is a fillet weld which does suggest some inherent limitations in process economy and structural integrity of the structural member so formed.

U.S. Pat. No. 4,562,630 describes a process for the manufacture of heat exchange elements wherein thin sheets of metal are lap welded along spaced parallel seams defining a channel. At least one of the sheets is provided with a longitudinally extending groove which forms the channel recess and a liquid filler material is introduced into the thus formed cavity and allowed to solidify. The solidified filler material is used as a supporting core while the metallic tube is subjected to plastic deformation to achieve a desired cross sectional shape. The heat exchanger structure so formed comprises a plurality of hollow parallel tubes separated by webs.

U.S. Pat. No 4,301,348 describes a continuous method of forming square steel pipes from relatively thick metal plates. In this process steel plate is continuously paid off a roll and severed into lengths which are subsequently folded to a desired cross-sectional shape. The partially formed hollow pipes are then tack welded end to end and then the free edges of the section are brought together under pressure from rollers to enable a continuous seam weld by high frequency welding.

The tack welded beams are then severed at the tack weld regions to form hollow pipes of predetermined length.

While abovementioned PCT specification PCT/AU89/00313 disclosed a structural member comprising a single strip of metal roll formed to provide a web with hollow flanges, it has been discovered that in many instances manufacture of a structural member by roll forming from a single metal sheet was not desirable and sometimes it is found to be more beneficial to roll form structural members comprising one or more webs and two or more hollow flange sections wherein the structural member was formed from a multiplicity of separate components.

Some of the advantages of using a multiplicity of separate metal components or strips instead of a single metal sheet or strip in relation to manufacture of a structural member having one or more web and two or more hollow flange sections are set out hereinbelow:

(a) The process enables a different thickness of metal to be used for any or all of the web and flange sections. Thus, by varying the thickness of the web relative to the flanges this allows flexibility in the combination of shear capacity and bending capacity of the structural member. The use of thicker metal in the flanges rather than in the web will aid in the structural efficiency of the structural member in bending. Also, one of the flanges could be of thicker metal than the other flange whale still maintaining the same outside dimensions. For special applications such as a composite beam where monosymmetry of the hollow flange beam section is more efficient, the external visual appearance is not altered and the reduction of member stability due to buckling is kept to a minimum.

(b) A different strength grade of the metal may be used any or all of the flanges and the web. Thus, a higher strength metal in the flanges than in the web will aid in the cost efficiency of the structural member since the lower strength web metal is normally less expensive. Also, there may be special circumstances where one flange does not need a metal strength as high as the other flange. Use of high strength metals may also allow the use of thinner steel sections to achieve a reduction in overall mass.

(c) The web plate may be extended as far as is desired into the hollow flange. Extending the web plate to butt against and be welded to the interior of the hollow flange will be of great benefit for supporting concentrated loads on the flange.

It is an object of the present invention to provide a process for continuous formation of a structural member formed from a multiplicity of separate components which process may alleviate the disadvantages of the prior art structures and/or methods for forming same.

The invention, in one aspect provides a method of continuously forming a structural member having at least one web component and at least one hollow flange component including the steps of:

(i) guiding said at least one web component into a predetermined abutting Juxtaposition with at least one simultaneously roll formed hollow flange component;

(ii) continuously fusing said at least one hollow flange component to a respective longitudinal edge of said at least one web component to form an integral structure; and, (iii) subsequently severing said continuously formed structure into predetermined lengths.

In regard to steps (i) and (ii) above, it is emphasised that these steps include the situation wherein the juxtapositional orientation of the components and the welding can occur separately or simultaneously in the same or spatially separated regions in a continuous fabrication process.

The hollow flange components may be roll formed in adjacent roll forming stations associated with a single roll forming mill or alternatively the hollow flange sections may be roll formed in separate roll forming mills.

Preferably roll forming of the hollow flange components and fusion to the one or more web components occurs in a single apparatus. Each hollow flange component and said one or more web components may be formed from respective coils of metal strip or from the same coil which is initially slit or otherwise separated into necessary precursor strip components.

Fusion of respective web and hollow flange components may be achieved in a number of ways.

The hollow flange component may be roll formed to a predetermined cross sectional shape from a flat strip of metal and its free edges are fused together to form an integral hollow member before being subsequently fused to a longitudinal edge of a respective web component.

Alternatively, the free edges of the roll formed hollow flange component may be fused to opposing surfaces of the web component adjacent the edge thereof to form a closed hollow flange formed integrally with the web.

In yet a further alternative, the free edges of the roll formed hollow flange component may be fused to opposing surfaces of the web component inwardly from an edge thereof whereby a free edge of the web extends at least partially into the interior of said hollow flange or completely into the hollow flange whereby the free edge of the web member abuts an interior surface of the hollow flange. If required, the free edge of the web may be fused to the interior of said hollow flange to form separate compartments therein and/or to reinforce said hollow flange.

In another embodiment structural members having at least one web and at least one hollow flange may be formed by fusing to at least one longitudinal edge of a generally planar web a generally planar flange strip intermediate the longitudinal edges of the flange strip and subsequently roll forming said flange strip to form one or more hollow flange members along said at least one longitudinal edge of said web.

The free edges of said flange strip may be deformed in a direction away from said web to form a hollow flange member.

Alternatively the free edges of said flange strip may be deformed in a direction towards said web to form a hollow flange member divided internally by an edge portion of said web.

Suitably the free edges of the flange strip may be fused together to form a hollow flange when deformed in a direction away from the web.

Similarly, when the free edges of the flange strip are deformed in a direction towards the web, those free edges may be fused to the web to form a hollow flange with the web extending therefrom.

The structural member may be formed with hollow flanges extending along both sides of the web with either or both of the flange strips being deformed in a direction towards or away from the web.

If required, the structural member may include one hollow flange and a solid generally planar flange extending along opposite edges of said web.

The free edges of the flange strips on opposite sides of a web may be deformed in a direction towards said web and adjacent free edges of opposing flange strips may be fused together to form a hollow member divided by a web.

The free edges of one or more of the flange strips may be roll formed to form a flange member having hollow flange elements extending longitudinally thereof.

The respective hollow flanges may be formed with any suitable cross sectional shape and may be the same or different in a structural member having two or more hollow flanges.

Similarly the hollow flanges may be of similar or different cross-sectional area and may be formed from metal strips having the same or different thickness. The web component may be planar or it may be contoured in a transverse or longitudinal direction.

The structural member may be symmetrical or asymmetrical about given axes.

The structural member may be generally planar in cross-sectional configuration or it may be non planar in respect of adjacent webs.

Any suitable means may be employed to achieve fusion between respective web and hollow flange components.

Preferably high frequency induction and/or resistance welding techniques are employed with the present invention to facilitate high line speeds, consistency and structural integrity of welds and extreme flexibility in the application of welds between adjacent members.

Although other welding techniques may be employed with the invention, these techniques are considered to possess one or more disadvantages when compared to high frequency induction or resistance welding techniques.

Other fusion techniques include:
(i) shielded metal arc welding (SMAW) which requires the use of flux material on a consumable electrode which vaporises to form a shielding gas around the molten weld metal;
(ii) gas metal arc welding (GMAW) or metal inert gas welding (MIGW or MIG) which requires the use of a consumable electrode and also a shielding gas;
(iii) gas tungsten arc welding (GTAW or TIG) which requires the use of a non-consumable tungsten electrode and a filler wire fed in separately as well as shielding gas;
(iv) flux core arc welding (FCAW) which requires the same materials as SMAW; and
(v) gas welding, e.g. oxy/acetylene.

Although these other techniques may be applicable in the fabrication of certain structural members according to the invention (and to this extent fall within the scope of the invention as it may relate to continuous production of certain novel structural members per se) there are a number of inherent limitations associated with the use of these welding techniques.

In all of the welding techniques which require the use of consumable electrodes, it is possible only to form a fillet weld at a perpendicular Junction between adjoining metal components. In many cases, (for example with hollow flanges) it is possible only to form a fillet weld at the exposed side of the joint. For thick metals, the use of a single fillet weld may necessitate several weld applications to obtain initial penetration and subsequently to build up the weld thickness.

As a rule, it is difficult to control automated continuous welding with consumable electrode welding systems to maintain a consistent standard of weld integrity. This difficulty is exacerbated when it is required to weld sections of differing thickness, particularly on a high speed manufacturing line. Apart from the high cost of consumables such as electrode materials and shielding gases, these techniques are generally suitable only for welding of articles of finite length rather than in a continuous process which would otherwise require continual replenishment of consumables.

Generally speaking, gas welding using such gases as oxygen and acetylene is to slow a process, difficult to automate and gives rise to severe distortion in welded articles, particularly when thin metal are employed.

Forge welding is inappropriate to welded Joints where access to one side only of the joint is possible.

Accordingly, it is particularly preferred to use high frequency electrical induction or resistance welding according to the present invention to accommodate the following characteristics associates with the present invention:
1. Continuous production
2. High line speeds
3. Maximised weld strength
4. Fluid tight integrity of weld when hollow flanges used as conduits for liquid and gaseous fluids.
5. Neat weld appearance with little or no post finishing except perhaps for simultaneous scaring operation.
6. Multiple simultaneous welds with minimum stress and/or deformation.
7. Multiple components of the same or varying thickness.
8. Minimum downtime in setting up and changing over apparatus for different products.

In order that the process according to the invention may be more clearly understood, reference is now made to various preferred embodiments illustrated in the accompanying drawings in which:

FIG. 1 illustrates schematically the typical stages of formation of a structural member having a central web and hollow flanges extending along the edges of the web.

FIGS. 17-37 illustrate schematically a non-exhaustive array of cross sectional shapes possible according to the present invention.

Figure 2:
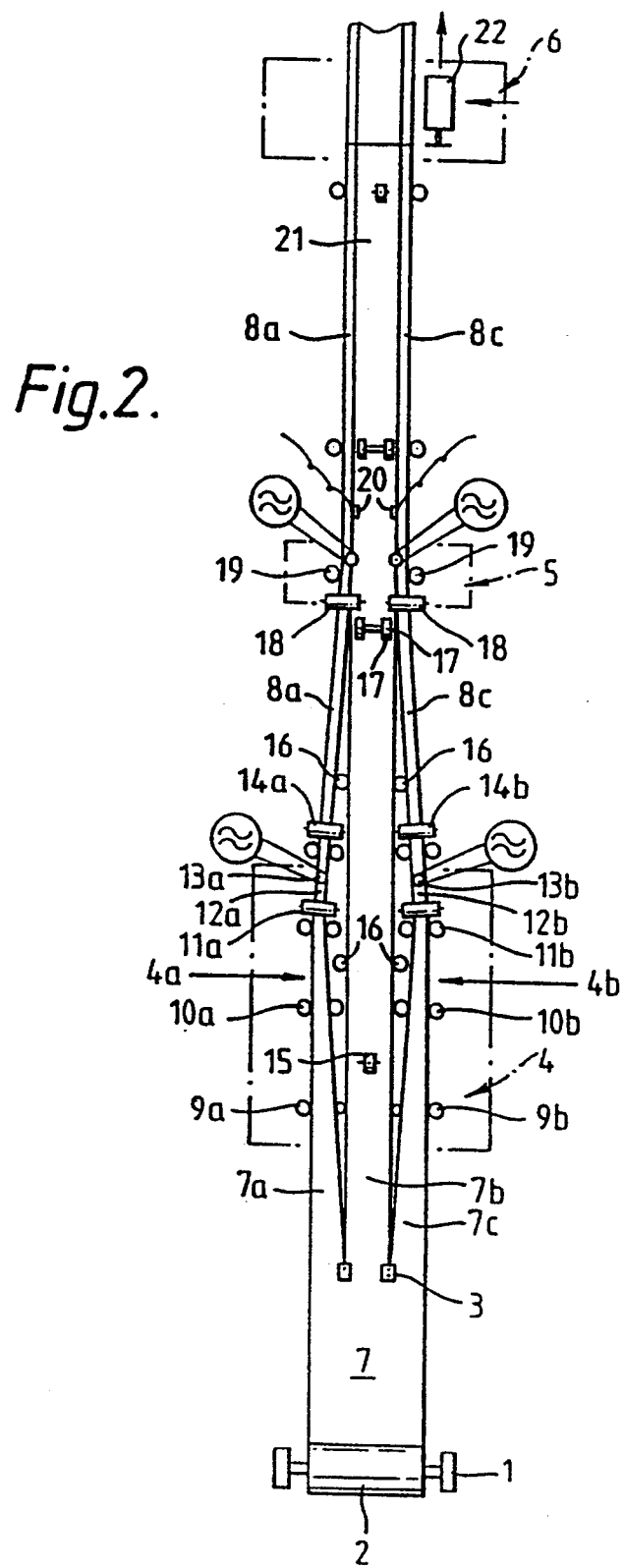
FIG. 2 illustrates schematically one form of roll forming/welding apparatus.

In FIG. 1 each of the three plates enters the process as a planar metal strip, the web plate perpendicular to the two flange plates as shown in stage 1. The orientation of the plates, either relative to each other or globally, need not necessarily be as shown in the diagram. It is possible, for example, that the web plate could be in the vertical position and the flange plates horizontal, or that all of the plates begin in the horizontal position. It is also possible that the web plate is brought into the final position between the flanges at any stage before welding.

Each flange plate passes through a series of forming stations to successively deform the metal strip into a substantially hollow section wherein the free edges are located adjacent to the web plate, as shown in stages 2 to 4. It is also possible that the web plate is subjected to preforming operations wherein ancillary or additional structural features or embellishments may be imparted to the metal strip in order to provide benefits for the particular end use of the product. Such additional features may include perforation or dintouring, either in a transverse or longitudinal direction.

The free edges of the deformed flange plates (4 edges in total) are then welded to the web so as to form the hollow flanges (stage 5). Any type of fusion welding is possible, but the favoured method is high frequency electric resistance welding.

At the welding station it is also within the scope of the process of the invention to apply one or more scarfing operations to the workpiece whereby weld projections or excess weld bead may be removed. As an alternative to scaring to remove excess weld bead, there also may be used weld bead flattening.

Finally, the workpiece is passed through a shaping and straightening station wherein a series of shaping rolls are used to produce the desired cross-sectional profile (stages 6 to 8). A series of straightening rolls is then used to ensure the straightness of the final product. However, it is also possible to avoid the use of shaping rolls by direct forming each metal strip so that after passing through the welding station it is already in the desired final shape.

In FIG. 2 the apparatus comprises a let off stand 1 supporting a coiled roll 2 of sheet steel, a slitting station 3, a tandem roll forming mill shown generally at 4, a welding station shown generally at 5 and a severing station shown generally at 6.

As the sheet of steel 7 leaves the roll 2 it proceeds to a slitting station 3 where the sheet 7 is slit into strips 7a, 7b and 7c of appropriate width.

Strips 7a and 7c are slit to widths appropriate for the desired shape and cross sectional area of hollow flanges 8a, 8c to be subsequently formed from those strips and strip 7b forms a web of desired width.

After slitting, strips 7a, 7b and 7c proceed to a tandem roll forming mill 4 comprising tube forming stations 4a and 4b spaced laterally on each side of strip 7b.

Strips 7a and 7c are progressively deformed in shaping stations 9a, 9b, 10a, 10b and 11a, 11b respectively to form hollow members 12a, 12b respectively of predetermined shape. The abutting free ends of respective strips 7a, 7c are butt welded by high frequency induction or resistance welding at welding stations 13a, 13b to form hollow tubes 8a, 8c having a continuous integral wall. The tubes 8a, 8c then proceed to final shaping and sizing stations 14a, 14b respectively.

In the region between roll forming stations 9a, 10a, 11a, 14a and 9b, 10b, 11b, 14b respectively the planar strip 7b is supported by rollers 15 having horizontal axes and also by slotted rollers 16 on vertical axes which support the edges of strip 7b.

In the region of welding station 5, the tubular members 8a, 8c and the central web 7b are guided into abutting relationship by rollers 17, 18 and the free edges of web 7b are butt welded to the surface of tubes 8a, 8c by high frequency induction or resistance welding in the presence of nip rollers 19 which urge the members together for fusion. Scarfing cutters 20 remove any excess bead from the region of the weld.

The continuously formed integral structure 21 comprising a central web and hollow edge flanges then proceeds to a severing station 6 whereupon structure 21 is severed into predetermined lengths by a flying saw 22.

Figure 3:
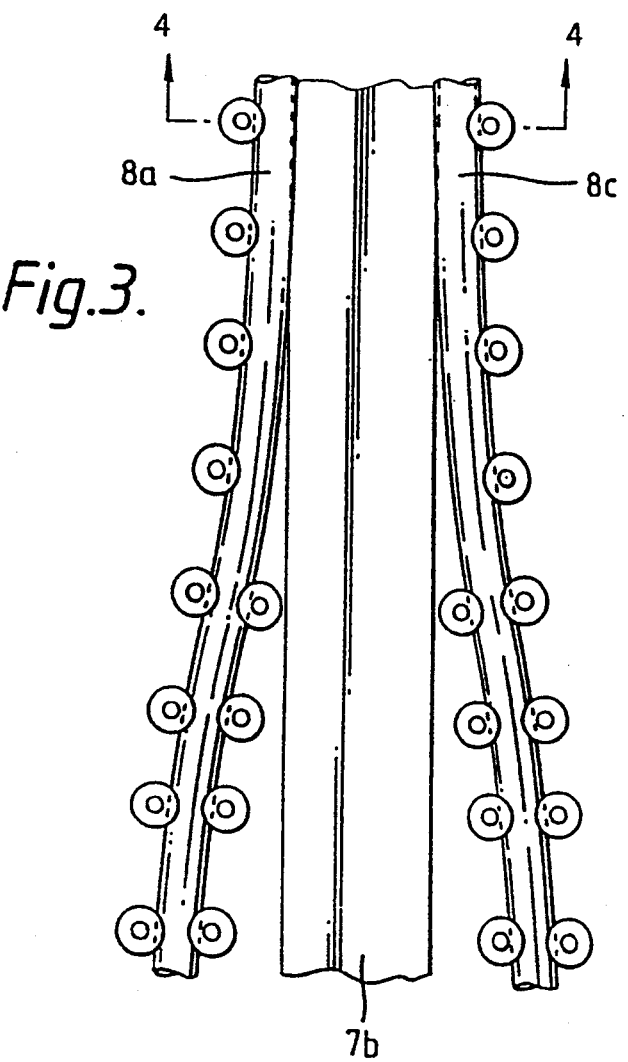
FIG. 3 is an enlarged view of the region encircled in FIG. 2.

FIG. 3 is an enlarged view of the convergence region encircled in FIG. 2 showing the convergence of tubular members 8a, 8c with web 7b.

Figure 4:
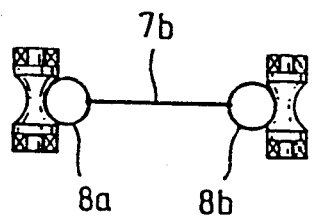
FIG. 4 is a cross-sectional view through A—A in FIG. 3.
Figure 5:
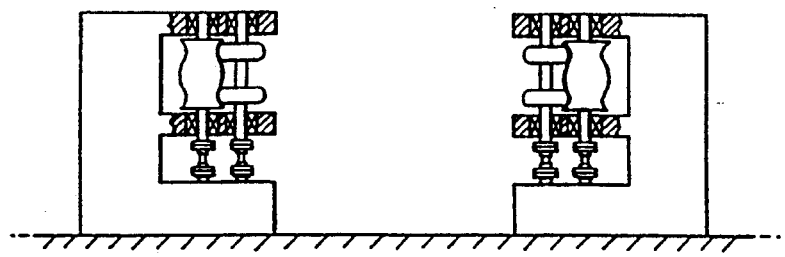
FIGS. 5-12 illustrate schematically the progressive contouring of the hollow side flanges in the roll mill 4 shown in broke outline in FIG. 2.
Figure 6:
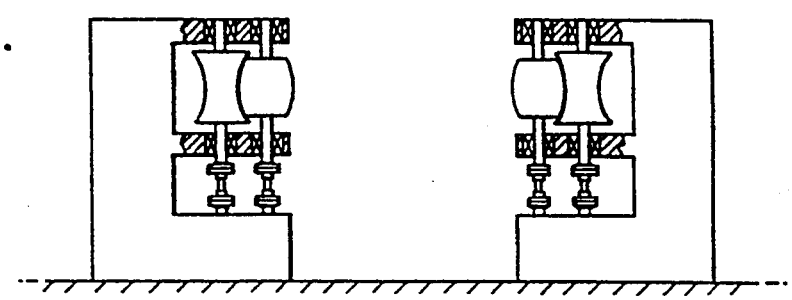
Figure 7:
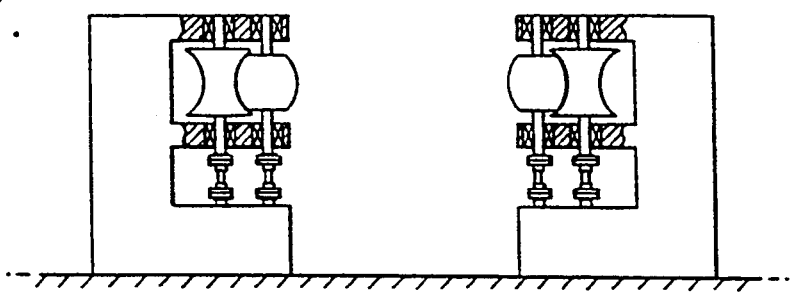
Figure 8:
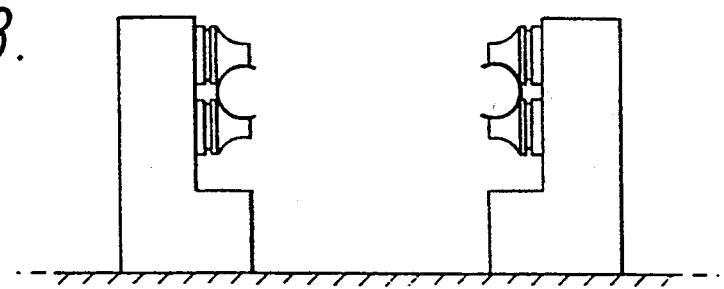
Figure 9:
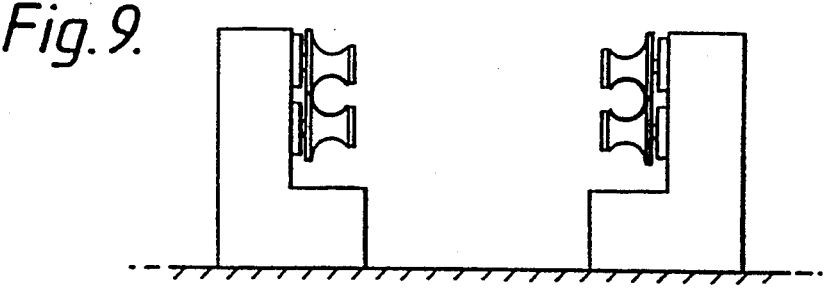
Figure 10:
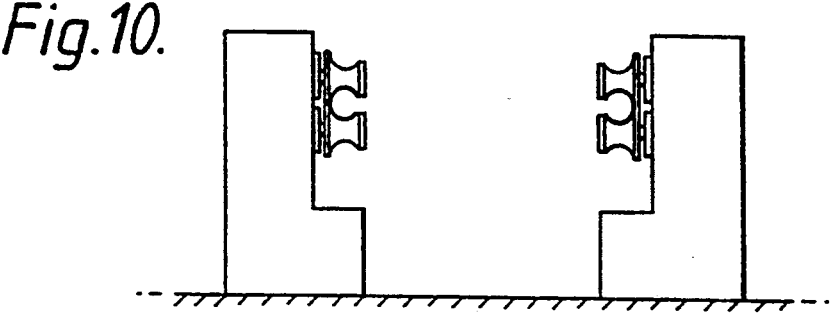
Figure 11:
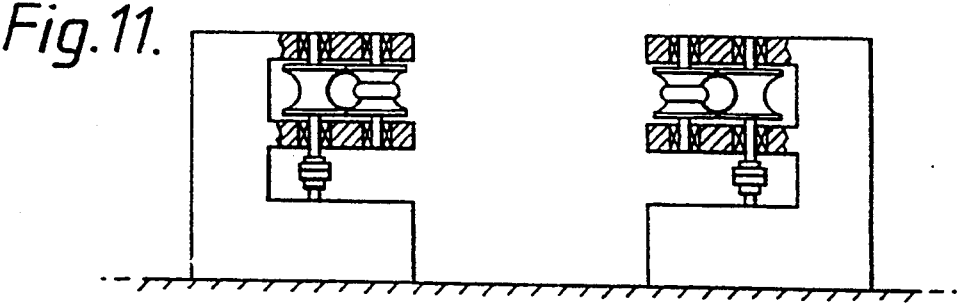
Figure 12:
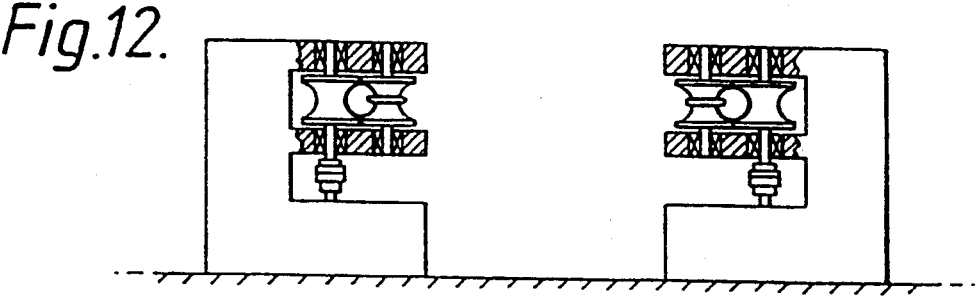

FIG. 4 is a cross sectional view through A—A in FIG. 3.

FIGS. 5–12 show schematically the progressively forming flange tube profiles at various roll stand positions in the roll forming mill region 4 shown in broken outline in FIG. 2.

Figure 13:
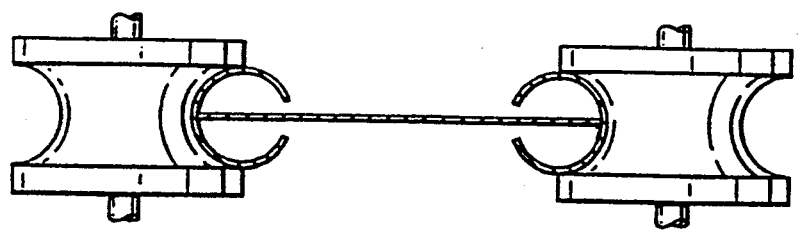
FIGS. 13-15 illustrate schematically alternative cross sectional configurations at welding station 5 shown in broken outline in FIG. 2.
Figure 14:
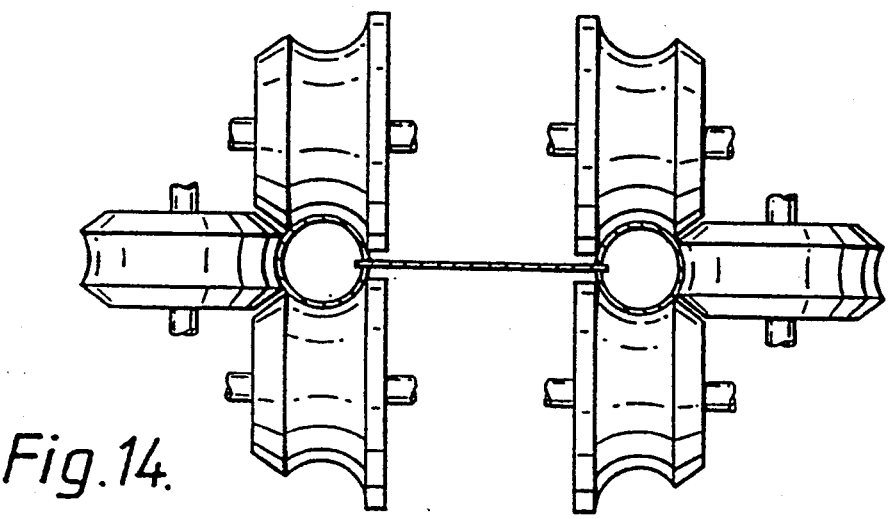
Figure 15:
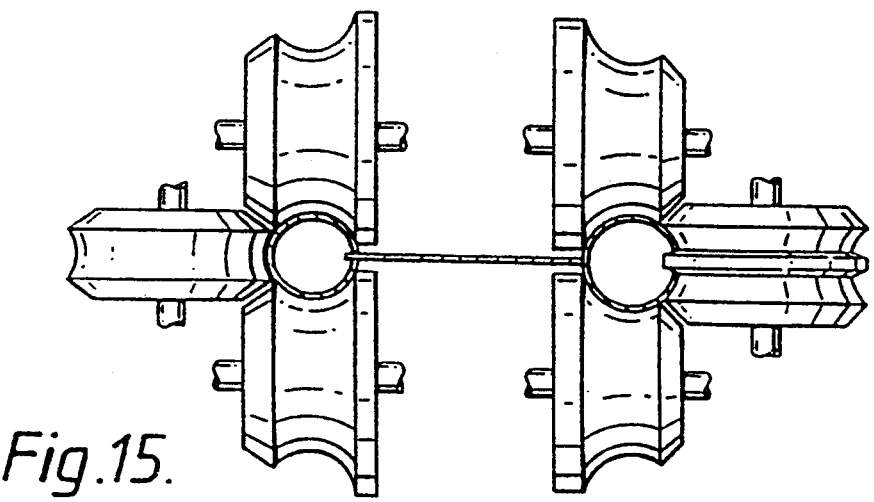

FIGS. 13–15 show schematically cross sectional views of various web/hollow flange welding configurations adjacent the welding station 5 shown in broken outline in FIG. 2.

Figure 16:
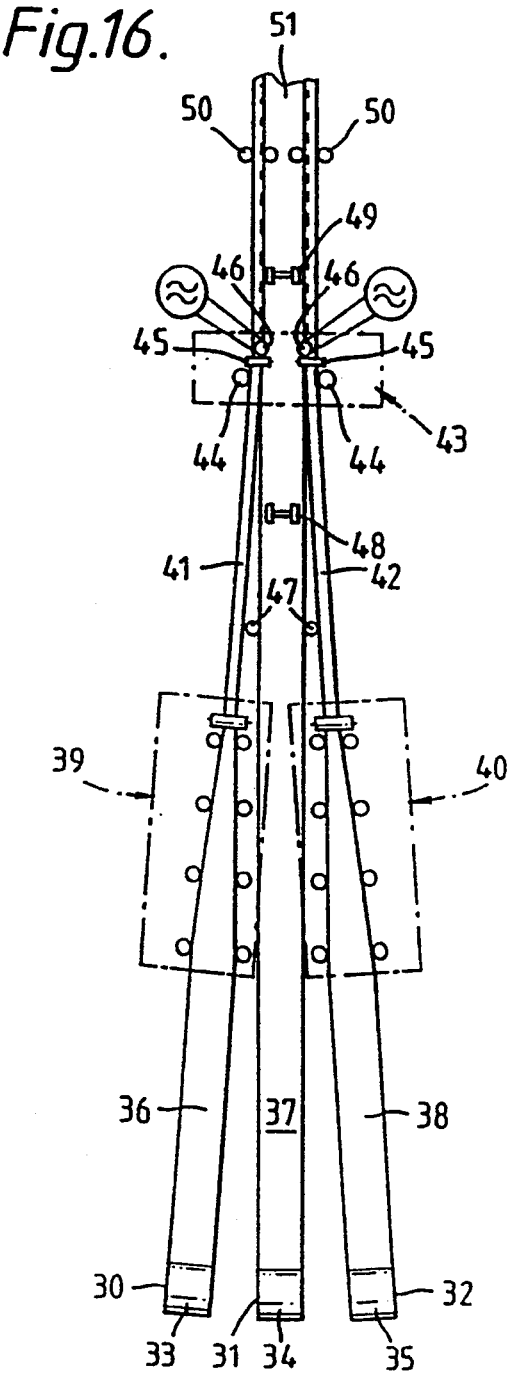
FIG. 16 illustrates schematically an alternative form of roll forming/welding apparatus.
Figure 17:
Figure 17B:
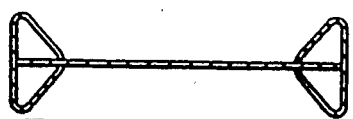
Figure 18A:
Figure 18B:
Figure 19:
Figure 19B:
Figure 20A:
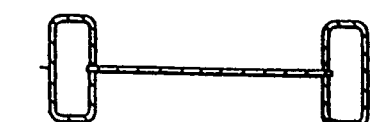
Figure 20B:
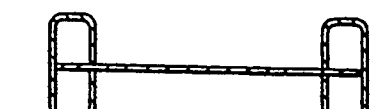
Figure 21A:
Figure 21B:
Figure 24:
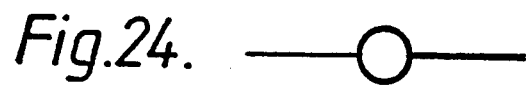
Figure 28:
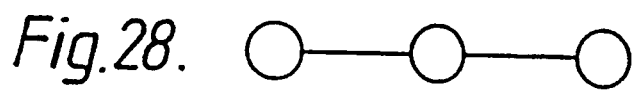
Figure 31:
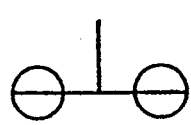
Figure 31:
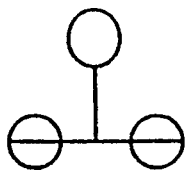
Figure 32:
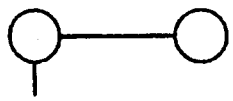
Figure 32:
Figure 33:
Figure 34:
Figure 34:
Figure 35:
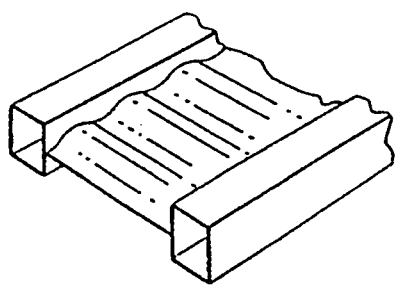
Figure 36:
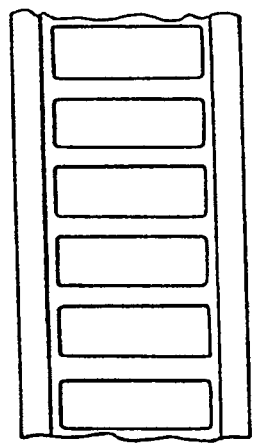

FIG. 16 shows schematically an alternative arrangement to that of FIG. 2.

In FIG. 16 the apparatus comprises separate let-off stations 30, 31, 32 each supporting separate coiled rolls 33, 34, 35 of sheet steel, each of the same or different thickness and width if required. Strips 36 and 38 issuing from rolls 33, 35 respectively are directed to roll forming mills 39,40 to form hollow members 41, 42 respectively of predetermined shape and cross sectional area. Unlike the system illustrated with reference to FIG. 2, the free edges of strips 36 and 38 are not welded together to form a continuous wall—rather, the respective pairs of free edges are slightly separated to form continuous slots which face a respective edge of central strip or web 37.

In the region of welding station 43 the free edges of web 37 are guided by rollers 44 into the respective slots in adjacent hollow members 41, 42 to a respective distance equal to the respective wall thicknesses of members 41, 42. Nip rollers 45 compress members 41,42 to urge their respective free edges into contact with upper and lower surfaces of web 37 immediately prior to welding by high frequency electrical induction or resistance welding units 46. Rollers 47, 48, 49 and 50 initially support web 37 and subsequently the integral structure 51.

The structure 51 is then severed into predetermined lengths by a flying saw (not shown) or the like.

Suitably roll forming mills 39, 40 are laterally movable to accommodate differing widths of web 37.

A number of significant variations to the method and apparatus of the invention to achieve a wide variety of structural members.

For example, either of the systems of FIGS. 2 or 16 may be adapted for the welding process described in the alternative system. Further, in the process of welding the lips of a slotted tubular member to the opposing surfaces of a web member, the free edge of the web member may be guided fully into the tubular member until it engages the inner wall of the tubular member. If required the free edge of the web may be additionally welded to the interior of the tubular member by high frequency induction welding to form a hollow flange divided into separate fluid tight compartments.

In other variations the central web may include pre or post formed apertures or it may include a longitudinally or transversely extending profiled shape in the form of deep or shallow channels, ribs or the like. In the case of transversely extending contoured profiles, the inwardly facing regions of opposed hollow flanges include planar faces arranged perpendicularly to the edges of the web to facilitate welding of the components of the structural member.

Tapered structural members may be fabricated by the use of a web having alternating inwardly and outwardly directed edges at regular and predetermined intervals. The continuous structure so formed is severed at regions of major and minor width to form tapered structural members.

Although the various aspects of the invention have been illustrated with reference to a structural member comprising a central web having hollow side flanges, it should be appreciated that the invention is applicable to a wide variety of combinations of webs and hollow flanges. By way of non-limiting example, a variety of cross sectional shapes are illustrated in FIGS. 17–37 and it will be clear to a skilled addressee that for structures formed from more than three components, appropriate modifications and additions will be required to the systems illustrated in FIGS. 2 and 16.

It will be equally clear to a skilled addressee that in FIGS. 17–37 the hollow flanges shown schematically as circular in cross section may be of any cross sectional shape able to be produced by roll forming. Such shapes include oval, elliptical, square, rectangular, triangular, polygonal and may be symmetrical or asymmetrical. The web and hollow flanges may be joined by the web edge or tube lip welding methods described above or a combination thereof.

It will be clear to a skilled addressee that structural members made in accordance with the present invention may be used for a variety of purposes. Examples of end use may include:

Fence panels

Truss members

Truss members with integral reticulation for fire extinguishing systems.

Truss members with integral services conduits.

Reinforcing members for mine roofs and floors.

Replacement for conventional I-beams, H-beams, T-beams, Z-beams and RSJ's and like structural members.

Reinforcing members for concrete structures.

For structural applications, the wide relatively thin web section provides a convenient member for attachment of support brackets, connecting members and the like. If required the structural members according to the invention may be provided with one or more welded strip flanges either on a hollow flange member or on a planar web member. The additional strip flange may be employed as a mounting means for items to be attached to or supported by the structural member. FIG. 32a illustrates a structural member with a strip flange.

Subsequent interconnection of selected lengths of various cross sectional shapes can give rise to unique structures. For example interconnection of respective flanges of the structure shown in FIG. 32b can give rise to a straight or tapered box section member having a tubular member at each corner. Complex structures may be achieved by interconnection of various cross-sectional shapes.

Figure 37:
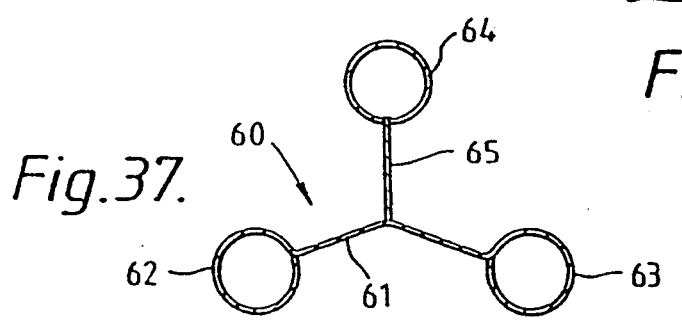

FIG. 37 illustrates a particularly effective beam structure which may be used in applications having a high resistance to torsional failure. Such applications may include horizontal beams and upright supports, particularly free standing pole-like members. The structure may be fabricated from separate web and flange members but, as illustrated, may comprise a first member 60 formed from a single strip of metal in a first roll mill in accordance with the process of co-pending patent application number PCT/AU89/00313 (the disclosure of which is incorporated herein by cross-reference) and subsequently deformed to provide a channel shape central web 61 with hollow flanges 62, 63.

A third hollow flange member 64 is formed in an adjacent roll forming mill and members 60 and 64 are then converged to be welded to opposing sides of web 65.

FIG. 38 illustrates schematically an alternative method of forming hollow flanges on a web of a structural member.

Although, for the sake of simplicity, the following description is limited to the formation of a single hollow flange on a web, it should be understood that the process is equally applicable to the formation of other hollow flanges in structural members comprising two or more hollow flanges.

Figure 38A:
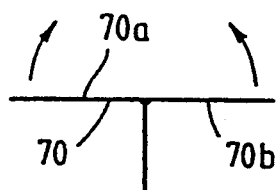
FIGS. 38 and 39 illustrate schematically an alternative method of formation of hollow flanges on a web.

In FIG. 38(a) a planar flange strip 70 is fused to a planar web strip 71 by high frequency induction or resistance welding utilizing a modified form of the apparatus illustrated in FIG. 2 or FIG. 16. Alternatively, the web 71 may be fused to flange 70 by a forge welding process described generally in U.S. Pat. No 3,713,205, the disclosure of which is incorporated herein by cross-reference.

After fusing web 71 and flange 70 in a perpendicular configuration, the sides 70a, 70b of flange 70 are deformed away from web 71 in a roll forming mill to form a hollow flange member 72 with the free edges of sides 70a, 70b being fused together by a suitable continuous welding process such as high frequency electrical induction or resistance welding.

Figure 38B:
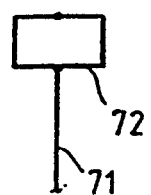
Figure 38C:
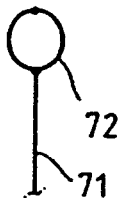
Figure 38D:
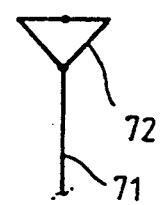
Figure 39A:
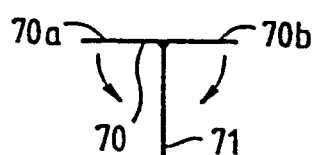
Figure 39B:
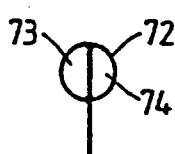
Figure 39C:
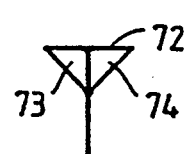
Figure 39D:
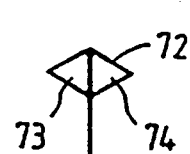

FIGS. 38b, 38c and 38d are exemplary of hollow flange shapes which may be obtained by this process.

FIG. 39 shows a variation on the process of FIG. 38 wherein the sides 70a, 70b of flange 70 are deformed towards web 71 and the free edges of sides 70a, 70b are fused to opposing sides of web 71, preferably by high frequency electrical induction or resistance welding.

The hollow flange 72 so formed is divided into separate compartments 73, 74 by web 71 which serves to reinforce the hollow flange 72 against the buckling mode of failure. In this manner it is possible to employ a flange 70 of a lesser thickness or lower grade of steel that may otherwise be required for a non reinforced hollow flange.

Figure 40:
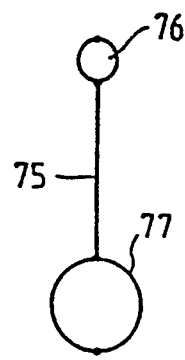
FIGS. 40-47 show schematically a non exhaustive array of cross sectional shapes according to the alternative method illustrated in FIGS. 38 and 39.

FIG. 40 shows a cross section of a structural member comprising a web 75 and hollow flanges 76, 77 of differing size. In this example, hollow flanges 76, 77 are formed by deforming a planar flange strip away from web 75 as shown generally in FIG. 38.

Figure 41:
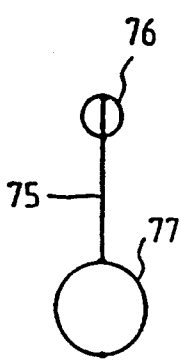

FIG. 41 shows a variation of the structure of FIG. 40 wherein hollow flange 76 is formed by deforming a flange strip towards web 75 as shown generally in FIG. 39.

Figure 42:
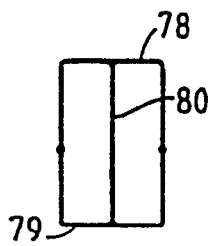
Figure 43:
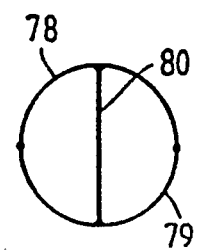

FIGS. 42, 43 show yet another variation wherein the free edges of flanges 78, 79 are fused together to form a hollow member divided by a web 80.

Figure 44:
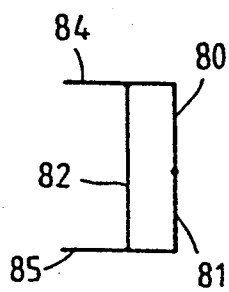

FIG. 44 shows a further variation on the structure of FIG. 42 wherein the free edges on one side of asymmetric flanges 80, 81 are fused together to form with web 82, a hollow beam 83 with longitudinally extending solid flanges 84, 85.

Figure 45:
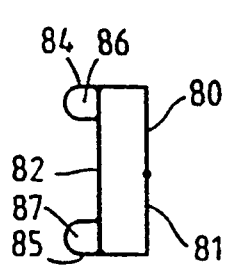

FIG. 45 is a variant of the structure of FIG. 44 wherein solid flanges 84, 85 are deformed towards web 82 to form hollow compartments 86, 87 with the free edges of flanges 84, 85 being fused to web 82.

Figure 46:
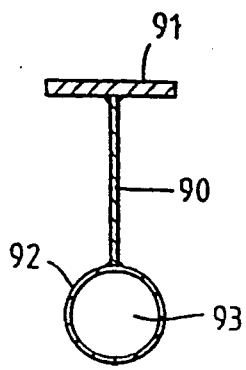

FIG. 46 illustrates yet another configuration of a structural member according to the invention.

In this embodiment a web 90 is fused to parallel flange strips 91, 92 by forge welding or high frequency electrical induction or resistance welding to form a member having a generally I-shaped cross section. Each of web 91 and flange strips 91 and 92 are of differing thickness.

The free edges of flange strip 92 are then deformed away from web 90 by roll forming and the free edges thereof are fused together to form a hollow flange 93.

Figure 47:
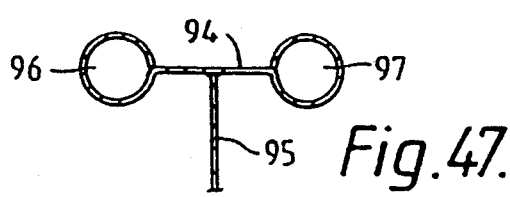

FIG. 47 shows an embodiment wherein a flange strip 94 is fused to web 95 by forge welding or high frequency electrical induction or resistance welding and subsequently the opposed edges of flange strip 94 are roll formed to form hollow flanges 96, 97 on opposing sides of flange strip 94.

A particular advantage of the present invention over the prior art is that the manufacturing apparatus and process is readily adaptable to accommodate production of structural member having a wide range of length and width dimensions as well as metal thicknesses.

Typically, metal thicknesses in the range of about 0.5 mm to 20 mm may be employed in the process and products according to the invention.

I claim:

1. A method for the continuous formation of a structural member having at least one web element and at least one hollow flange element extending longitudinally of an edge of said web element, said method including the steps of:
    cold roll forming a first continuous strip of metal to form said at least one hollow flange element, the free edges of which are spaced to form a continuous aperture therein;
    guiding a second continuous strip of metal between said free edges and at least partially into said aperture; and
    continuously fusing said free edges to opposed faces of said web element by high frequency electrical induction or resistance welding.

2. A method as claimed in claim 1 wherein a third continuous strip of metal is cold roll formed to form a further hollow flange element the free edges of which are fused to opposed faces of said web element on a side thereof opposite to said first hollow flange element.

3. A method as claimed in claim 2 wherein said hollow flange element and said further hollow flange element are cold rolled in adjacent roll forming stations associated with a single roll forming mill or in separate roll forming mills.

4. A method as claimed in claim 1 wherein the free edges of said at least one hollow flange element are fused to opposing faces of said web element adjacent a respective edge thereof, said respective edge of said web element extending at least partially into the interior of said at least one hollow flange element.

5. A method as claimed in claim 1 wherein said respective edge of said web element abuts an internal surface of said at least one hollow flange element.

6. A method as claimed in claim 5 wherein said respective edge of said web element is fused to said internal surface of said at least one hollow flange element.

7. A method as claimed in claim 1 wherein first and further continuous strips of metal are cold roll formed to form respective first and further hollow flange elements, the free edges of which are spaced to form a continuous aperture in respective elements;
    guiding the opposing edges of the second continuous strip of metal between the respective free edges of said first and further hollow flange elements, at least partially into respective apertures therebetween; and
    continuously fusing the respective free edges of said first and further flange elements to respective opposing faces of said web element adjacent opposed edges of said web element by high frequency electrical induction or resistance welding.

8. A structural member whenever made in accordance with the method of claim 1.

9. A structural member according to claim 8 wherein said at least one web element and said at least one hollow flange element are formed from metal strips of different thicknesses.

10. A structural member according to claim 8 wherein said at least one web element and said at least one hollow flange element are formed from metal strips having different metallurgical properties.

11. A structural member according to claim 8 including a plurality of web and/or flange elements.

12. A structural member whenever made in accordance with claim 1 including a solid flange element extending longitudinally of said web element opposite said hollow flange element.

13. A method for the continuous formation of a structural member comprising at least one web element and at least one hollow flange element extending longitudinally of an edge of said web element, said method including the steps of:
    continuously fusing a first edge of a first continuous strip of metal to the surface of a second continuous strip of metal intermediate the edges of said second continuous strip; and
    subsequently cold roll forming said second continuous strip to form a closed hollow flange element extending longitudinally of an edge of said first continuous strip, said first continuous strip forming said web element.

14. A method as claimed in claim 13 wherein the free edges of said second continuous strip are deformed in a direction away from said first continuous strip.

15. A method as claimed in claim 14 wherein the free edges of said second continuous strip are fused together to form a closed hollow flange element.

16. A method as claimed in claim 14 wherein the free edges of said second continuous strip are deformed in a direction towards said first continuous strip.

17. A method as claimed in claim 16 wherein the free edges of said second continuous strip are fused to a respective face of said first continuous strip to form a hollow flange element extending longitudinally of said first continuous strip, said hollow flange element being divided into separate compartments by a portion of said first continuous strip.

18. A method as claimed in claim 13 wherein a third continuous strip of metal is employed to form a further hollow flange element extending along an edge of said web element opposite said hollow flange element.

* * * * *